G. P. KIMBALL.
Running-Gear.
No 39,785. Patented Sept. 1, 1863.
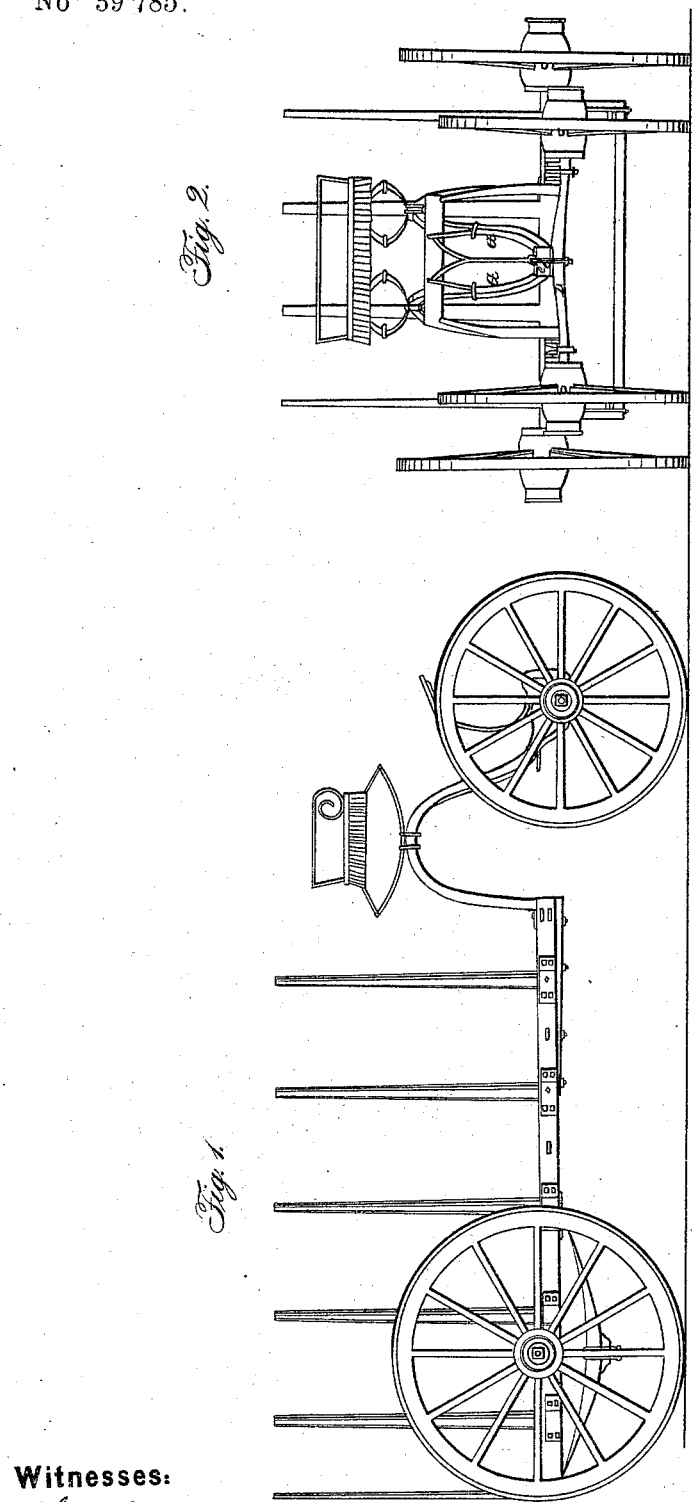
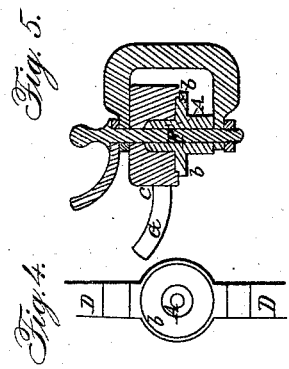
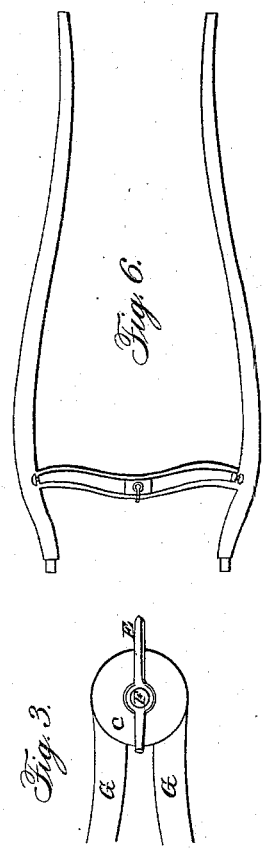
Witnesses:
Chas R Bond
Edmond Saul
Inventor:
Geo P Kimball

UNITED STATES PATENT OFFICE.

GEORGE P. KIMBALL, OF SAN FRANCISCO, CALIFORNIA, ASSIGNOR TO HIMSELF AND W. H. KNIGHT, OF SAME PLACE.

IMPROVEMENT IN CARRIAGE-COUPLINGS.

Specification forming part of Letters Patent No. 39,785, dated September 1, 1863.

*To all whom it may concern:*

Be it known that I, GEORGE P. KIMBALL, of the city and county of San Francisco, State of California, have invented a new and Improved Carriage Coupling; and I do hereby declare that the following is a full and exact description thereof, reference being had to the accompanying drawings, and to the letters of reference marked thereon.

In the drawings, Figures 3, 4, and 5 are all that is necessary to explain the different parts of the invention. Figs. 1 and 2 show the application.

The coupling is composed of four pieces, as follows: A is a metallic pin, with a flange or collar, b, around it, and is set on top of the forward axle of a carriage.

C is a cap set upon the pin A, its rim resting upon the flange or collar b. This cap is attached to the body of the carriage by the goose neck, (represented by G,) or in any other suitable manner. D is the axle. E is a clevis, the pin F of which passes through the pin, cap, and axle, thoroughly securing them together. H represents the driver's foot-rest. It is supported by the arms I, which extend from the goose neck G, and also by the forked brace K, which is secured between the clevis E and cap C. This method of coupling the forward axle-tree to wagons has a great advantage over the use of the common transient or king-bolt. It presents a much greater surface for wear, making it more durable, and is particularly adapted for use on trucks and other vehicles used for carrying heavy weights. Another great advantage is the twofold security given in the use of the pin F with the pin A and cap C, for should pin F (answering somewhat in the manner of a king-bolt) wear out or in any manner be disengaged, still the two parts of the wagon would hold together.

By this coupling the several parts can be coupled and uncoupled with the greatest facility, for the clevis E serves to hold the cap C to the pivot A preparatory to inserting the king-bolt, and in withdrawing the king-bolt the parts are still held together until the clevis E is withdrawn. I am thus also enabled to lubricate the several parts with the greatest facility.

Having thus described my invention and its mode of operation, I will now proceed to present my claim.

I claim—

The combination of the axle D with the flange b, pin A, cap C, clevis E, and king-bolt F, when constructed and arranged substantially in the manner and for the purpose herein described.

GEO. P. KIMBALL.

Witnesses:
 CHAS. R. BOND,
 EDMOND SAUL.